Dec. 21, 1943.  J. L. OSBORNE  2,337,488
METHOD OF PRODUCING DICYANDIAMIDE
Filed March 1, 1941
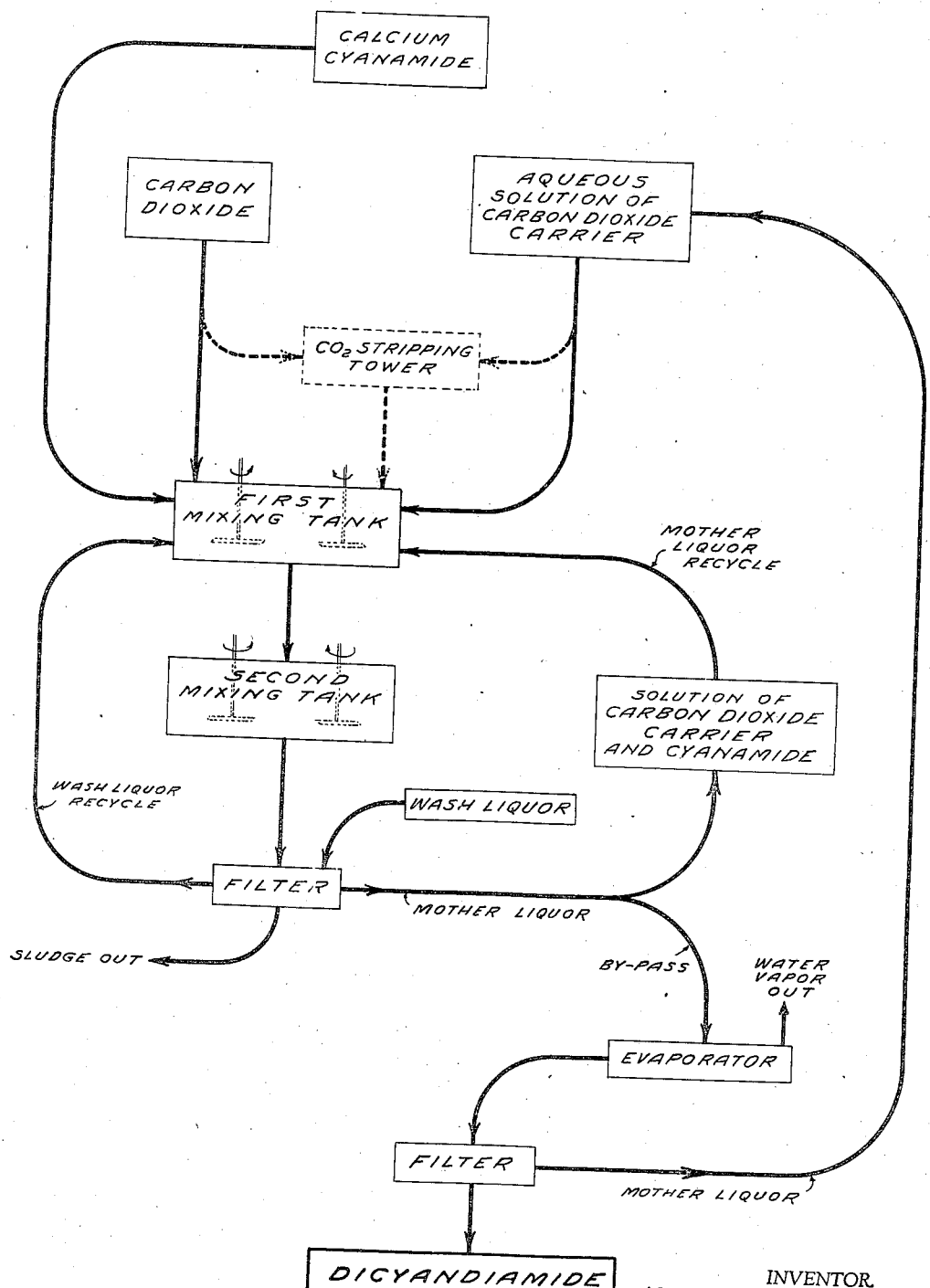
INVENTOR.
JOHN L. OSBORNE,
BY Frank J. Novotny, jr.
ATTORNEY.

Patented Dec. 21, 1943

2,337,488

UNITED STATES PATENT OFFICE 2,337,488

METHOD OF PRODUCING DICYANDIAMIDE

John L. Osborne, Elizabeth, N. J., assignor to American Cyanamid Company, New York, N. Y., a corporation of Maine Application March 1, 1941, Serial No. 381,289

5 Claims. (Cl. 23—190)

This invention relates to a process for preparing cyanamide and its polymers and more particularly to the conversion of crude calcium cyanamide into cyanamide and polymerization products thereof such as dicyandiamide, melamine, melem, and the like. The invention relates especially to a novel method for the preparation of dicyandiamide.

It is an object of this invention to prepare useful products from crude calcium cyanamide. Another object is to obtain a maximum yield of the desired products, more particularly by reducing the formation of undesirable by-products. Further objects and advantages of this invention will be found in the following description.

Heretofore, as disclosed in the prior art, carbon dioxide has been used to precipitate calcium carbonate from aqueous slurries of crude calcium cyanamide. However, such processes involve, essentially, gaseous-liquid reactions. When pure carbon dioxide is used, such reactions necessitate bulky, expensive and unusually complex mixing and diffusion apparatus in order to comminute the carbon dioxide bubbles and effect a better solution or contact of the carbon dioxide and liquid solvent. When stack gases are used as sources of carbon dioxide in these prior processes, the disadvantages become still greater, for then the use of gaseous-liquid reactions in the preparation of cyanamide and its polymers necessitates the processing of large volumes of inert gases. This requires unusually large, bulky equipment and necessitates treatment over extended time intervals. The operation of such processes as disclosed in the prior art is accordingly quite inefficient, principally because of the low solubility of carbon dioxide in water. Furthermore, these prior processes also fail to overcome the disadvantages attendant upon the low solubility of lime and calcium cyanamide in the water used to make up the aqueous slurry.

The present invention discloses a novel method of accelerating the reaction between carbon dioxide and crude calcium cyanamide slurries. It relates to a simple process for bringing about the better solution of carbon dioxide in the water forming the slurry. Thus, it has been found that by the addition of a suitable water soluble compound capable of carrying carbon dioxide in combination there is effected what is essentially a marked increase in the solubility of carbon dioxide. Furthermore the reaction of $CO_2$ and calcium cyanamide is completed more rapidly. This is due to the fact that the process is effected as a liquid to liquid rather than as a gas to liquid type of reaction. The solubilizing of the carbon dioxide converts the latter into a more readily available condition, diffused throughout the liquid, and hence effects the reaction as one closely approximating an ideal liquid to liquid type of contact.

These novel features in the process of the present invention make possible the use of smaller, less complicated apparatus. The present process also shortens the time necessary to complete the reaction of carbon dioxide with the lime. At the same time, it makes possible the use of lower pressures of carbon dioxide while effecting a greater concentration of carbon dioxide in solution. This results in a more efficient process and a more uniform quality of product.

In order to attain these objects in accordance with the broader aspects of this invention, it has been found that the recovery of combined nitrogen in the form of cyanamide and dicyandiamide from an aqueous slurry of crude calcium cyanamide or lime nitrogen by precipitating the calcium with carbon dioxide can be effected more efficiently and more easily if there is present in solution in the aqueous slurry a compound which reacts readily with carbon dioxide, holding the latter in combination and capable of readily reacting together with its combined carbon dioxide which precipitates the calcium as calcium carbonate. Among the compounds capable of reacting in this manner are the following: the alkali metal carbonates, such as sodium and potassium carbonate, guanidine, guanylurea, monoethanolamine and ammonia.

More specifically, in accordance with one embodiment of this invention, it is proposed that soda ash be dissolved in the liquor used to extract cyanamide from the crude calcium cyanamide slurry and that carbon dioxide be passed into the resultant slurry. Since in all such preparations, the calcium cyanamide is present in excess of that capable of being held in solution, it will be found that the soda ash serves as a carrier for the carbon dioxide and also accelerates the formation of calcium carbonate partly because of the favorable effect of the soda ash on the solubility of both the lime and the calcium cyanamide. A possible explanation of the reactions herein involved is given below, although the invention is not to be limited by this theoretical explanation of one possible method of its operation. The soda ash reacts with the lime which is present in the crude calcium cyanamide slurry as a dilute solution of calcium hydroxide. This forms sodium hydroxide and a precipitate of calcium carbonate. The sodium hydroxide solution formed absorbs carbon dioxide at a very rapid rate, reforming sodium carbonate which then reacts with the calcium acid cyanamide in the extraction liquor. This yields calcium carbonate as a precipitate and sodium acid cyanamide. Since the solution is in intimate contact with carbon dioxide it will absorb further amounts of carbon dioxide and form sodium carbonate or sodium bicarbonate in an aqueous solvent which also contains cyanamide. This solution is then concentrated, as by evaporation, and the cyanamide polymerizes to form dicyandiamide which is readily extracted by filtration.

It is to be noted that the use of the process of this invention not only makes possible a greater concentration of carbon dioxide in the slurry but also results in the presence of carbon dioxide in a more readily available and more readily reacting form than the usual gaseous state. This is due to the addition to the slurry of the above mentioned compounds. All of these compounds have a high affinity for carbon dioxide which is held in combination therewith. Hence these compounds are capable of serving, seemingly, as carriers of carbon dioxide which is held in combination and readily available for further reaction as with the calcium of the slurry. These compounds make possible a more complete absorption and solution of carbon dioxide in the mother liquor than could be effected if the carbon dioxide were bubbled through a slurry containing no such carrier compounds. Furthermore, with these compounds present, the carbon dioxide need be under little or no pressure in order to obtain a high concentration of carbon dioxide in solution. Heretofore equally high concentrations of carbon dioxide could be attained only by using carbon dioxide under several atmospheres pressure. Because of the low pressure solubilizing step characteristic of the process of this invention, it is unnecessary to carry out the process in such expensive air-tight autoclaves and pressure vessels as heretofore used.

The accompanying flow sheet diagrammatically illustrates a preferred embodiment of the invention. As shown, a quantity of an aqueous solution of a carbon dioxide carrier and crude calcium cyanamide in proper proportions and concentrations is worked up into a slurry with water, or with a recycled portion of the mother or wash liquor from a previous batch. The mixing tank is heated or cooled in order to maintain the temperature within optimum limits so as to obtain desirable yields and avoid excessive polymerization and decomposition due to side reactions which result in the production of $NH_3$, urea and the like. The slurry is prepared in an atmosphere of carbon dioxide under superatmospheric pressure in an autoclave or, alternatively, carbon dioxide is bubbled through the slurry or both steps are used simultaneously. The reactants are mixed, preferably, for an additional time interval in a second tank to increase the extraction of the product after which the slurry is filtered. In order to increase the concentration of nitrogen present in the form of cyanamide and later as dicyandiamide, the mother liquor forming the clear filtrate is recycled a number of times and reslurried with additional portions of crude calcium cyanamide, the combined recycled mixture being then finally filtered. When the mother liquor attains its optimum concentration it is withdrawn through the by-pass for further treatment. After a predetermined number of recycling steps including the reslurrying of the filter cake, the filter cake remaining as a sludge in the final filtration step is washed with a small amount of wash liquor in order to remove the greater portion of the entrained carbon dioxide carrier left therein. This wash liquor is recycled to form an aliquot part of a new batch or slurry of calcium cyanamide. The sludge remaining in the filter is removed from the system by scraping the filter plates clean of the spent sludge. A new slurry is then prepared as above described, the cycling and recycling steps are carried out, again terminating in a final filtration and removal from the extraction cycle of the mother liquor containing its optimum concentration of cyanamide and dicyandiamide.

In addition to the above batch process, the process can be readily effected by continuously drawing off a fractional part of the mother liquor or concentrate through the by-pass for further special treatment. The remaining portion is returned or recycled to the first tank where more crude calcium cyanamide and carbon dioxide as well as wash liquor and mother liquor from other sources, as shown, can be added to maintain the recycling volume constant.

The mother liquor withdrawn through the by-pass is concentrated in an evaporator, preferably by low temperature vacuum distillation, to remove the excess water. The carbon dioxide held in combination by the carrier is simultaneously evolved with the result that the alkalinity of the solution is increased to that of a solution having a pH of 11.0 or thereabout, whereupon practically all of the cyanamide polymerizes to dicyandiamide. The dicyandiamide, containing perhaps a small amount of cyanamide in the entrained liquor, is readily separated out by cooling and filtering the solution. The mother liquor forming the filtrate is recycled as shown to form a new slurry. If contaminated unduly with decomposition products, such as urea for example, it may be preferable to discard this filtrate.

When vacuum evaporation of the by-passed mother liquor is conducted at a low temperature, i. e., about 30° to 35° C., most of the cyanamide present polymerizes to form dicyandiamide due to the high alkalinity of the solution. Any remaining free cyanamide subsequently polymerizes on storage. However, if complete conversion of the cyanamide to dicyandiamide is desired immediately, the evaporation step may be omitted, particularly if the solution is stronger than about 10 or 12%. Thus, if the solution has a concentration of 15% or higher, it is not necessary to evaporate it further. Instead polymerization can be carried out by a carefully controlled heating step which effects a 100% conversion of the cyanamide to dicyandiamide. The dicyandiamide separates out in crystalline form and is easily collected by cooling the liquor and filtering as above described.

Only a small amount of the carrier is lost from the system by failure to wash the first filter cake whereupon the contained carrier is removed with the sludge. Another small portion of the carrier may be lost by failure to wash the final filter cake. However, by flushing these filter cakes with wash water the carrier therein is easily removed. Thus, the entrained carrier may be removed from the final product by washing it out of the filter cake with a small portion of water and simultaneously leaving the relatively insoluble dicyandiamide on the filter. Hence it is unnecessary to renew the entire supply of the carrier for each extraction. Instead, the addition of a small portion of the carrier or an aqueous solution thereof to the recycled mother liquor at intervals during the process or after each extraction cycle is ample to increase the concentration of the carrier in the mother liquor sufficiently for effective re-use upon further addition of carbon dioxide.

Although heretofore carbon dioxide of a high degree of purity was necessary in order to effect the precipitation of calcium from its slurries in a commercially feasible manner, the process of this invention makes possible the acceleration of the absorption, solution and reaction of the carbon dioxide and hence facilitates the use of such diluted and contaminated sources of carbon dioxide as stack gases whereas it has generally been necessary heretofore to depend upon the utilization of carbon dioxide of high concentration and purity in such reactions. In addition, the carbon dioxide by the process of this invention is rendered more readily available, being quickly transported by the carrier to the situs of the reaction and then because of its presence in higher concentration and more uniform solution it is possible to effect a more economical concentration of the product than heretofore thought possible and still work with a slurry containing a much lower percentage of solids than usually prepared. This facilitates the mixing of the slurry. Furthermore, the subsequent treatment of the slurry, such as the filtering step, is accelerated because the mixture is thinner and hence flows more readily, can be stirred more easily, or can be otherwise worked up more effectively. The resulting intensification of the mixing step together with the prolongation of the extraction step results in a more concentrated aqueous solution of the desired product for further processing and hence makes possible a more efficient process than heretofore effected.

The reactions involved may be briefly represented by the following equations when sodium carbonate is used as the carbon dioxide carrier:

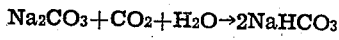

$$Na_2CO_3 + CO_2 + H_2O \rightarrow 2NaHCO_3$$

The sodium bicarbonate formed serves as a highly accessible source of carbon dioxide and reacts with the crude calcium cyanamide to precipitate calcium carbonate as follows:

$$CaCN_2 + 2NaHCO_3 \rightarrow CaCO_3 + H_2CN_2 + Na_2CO_3$$

Sodium carbonate is thus reformed and is in condition to react immediately with the incoming carbon dioxide to give the bicarbonate and continue the precipitation of more calcium.

The corresponding equations when guanidine, ethanolamine, potassium carbonate, ammonia and the like are used as the carbon dioxide carrier which holds the carbon dioxide in combination are closely analogous, as the carbon dioxide readily reacts in the form of the respective carbonate, likewise precipitating calcium carbonate.

The following examples are given to more clearly illustrate the process involved.

Example 1

1000 g. of water, 250 g. of crude calcium cyanamide and 70 g. of sodium carbonate were worked up into a slurry and sufficient carbon dioxide added thereto to precipitate the calcium and to react with the sodium carbonate and give a sodium bicarbonate solution having a pH of about 8.4. The resulting slurry was mixed further in another mixing kettle and then filtered. The filtrate was evaporated at a temperature below 35° C., cooled and the crystalline precipitate, predominantly dicyandiamide contaminated with such small amounts of cyanamide as is present in the entrained liquor, was recovered by filtration.

Example 2

By proceeding as above described in Example 1 but by carrying out the evaporation step at a higher temperature practically pure dicyandiamide was obtained. Thus, when evaporation was effected at a higher temperature in the range of about 60° to 80° C., or higher, the cyanamide polymerized yielding practically 100% of dicyandiamide which precipitated out of solution and was readily separated by cooling and filtering. The filtrate comprising mother liquor containing sodium carbonate was recycled to form a new batch or slurry of calcium cyanamide.

In addition to the above laboratory experiments, the following examples, conducted on a semi-plant or pilot plant scale are included herein to further facilitate an understanding of the invention.

Example 3

100 pounds of crude calcium cyanamide were gradually fed into a 300 pound mixture of wash water containing sodium bicarbonate and mother liquor containing sodium carbonate from a previous batch extraction. The slurry was fortified with about 5 to 10 pounds of sodium carbonate and 50 pounds of carbon dioxide were simultaneously supplied while maintaining the pH at 8.4 and keeping the temperature below 35° C. The resulting slurry was passed to another mixing kettle and then filtered. About 275 pounds of filtrate were obtained containing from 10% to 12% of cyanamide. The sludge on the filter was washed and the wash water recycled to form a new batch. Due to the low concentration of the product in the filtrate, the latter was further evaporated under vacuum and below 35° C. until crystals began to form whereupon the liquid was chilled and filtered. The yield was predominantly dicyandiamide, the cyanamide which first formed having polymerized to dicyandiamide, because of the increased pH. The filtrate was recycled to form the mother liquor for the next batch.

Example 4

A batch similar to that described in Example 3 was subjected to the same series of steps to obtain a corresponding 275 pound filtrate. In order to obtain a practically complete conversion to dicyandiamide, the solution of cyanamide comprising the 275 pound filtrate was evaporated at a temperature considerably above 35° C., in the present example 70° C., although other temperatures can also be used such as 60° to 80° or even 90° C. or higher. A highly alkaline sodium carbonate solution is formed by the evolution of $CO_2$ from the sodium bicarbonate solution. This results in a solution having a pH between 8.4 and 11.4, more probably about 10 or 11, when the higher temperatures above given are used to accelerate the polymerization of the cyanamide to dicyandiamide. Since the latter is relatively insoluble in the cooled mother liquor, the dicyandiamide is readily separated by cooling and filtering the crystalline precipitate. The filtrate is then recycled to form another batch or slurry of cyanamide for subsequent extraction.

The extraction step of the process described in the preceding examples is preferably carried out at a pH of approximately 8.4. Various changes may, however, be made in the particular steps, thus for example, if stack gases are used as the source of carbon dioxide it may be preferable to strip the $CO_2$ from the stack gases with an aqueous solution of a carrier, preferably when admixed with the slurry, the latter flowing counter-current to the stack gases, thereby precipitating $CaCO_3$, the whole mixture being led directly into the first mixing tank. Another alternative procedure is shown in dotted lines in the drawing. Likewise, various auxiliary apparatus not shown in the drawing may be used, such as automatic temperature control devices, cooling coils as well as pH controls which admit more calcium cyanamide when the pH becomes low or admit more of the carrier when necessary, as well as other controls. Such apparatus, well known to those versed in the art, may be used in order to obtain a closer control over the process herein described.

The essential feature of this invention is the relatively complete control of the process and the relatively rapid initiation of the reaction obtained by the use of sodium carbonate or a similar $CO_2$ carrier. The pH range is, of course, dependent on the particular compound used as well as the concentration thereof present. In the illustrative examples sodium carbonate solutions of 1.0 N up to 3.0 N or more proved to be highly effective.

In the examples given, guanidine or an ethanolamine can be used in place of sodium carbonate. In each instance dilute solutions of the respective carbon dioxide carriers of from 3% to 5% or even 10% strength fall in a desirable range. For example, when a dilute solution of guanidine is to be formed as the carbon dioxide carrier in an example similar to that given above in Example 1 for sodium carbonate, about 100 g. of guanidine is used. In the presence of carbon dioxide, guanidine carbonate is formed which serves as a readily available reaction product containing $CO_2$. Monoethanolamine can be used in the same way and is easily incorporated in the process illustrated by the above examples.

In addition to the carbon dioxide carriers hereinabove mentioned and specifically cited in the illustrative examples, such compounds as guanylurea, ammonia, and potassium carbonate may be used and are to be understood to be equivalents, chemically, of such compounds as guanidine, monoethanolamine and sodium carbonate, respectively.

It is to be understood that the examples are merely illustrative and not limitative of this invention except as expressly defined in the appended claims.

I claim:

1. The process of preparing dicyandiamide which comprises slurrying calcium cyanamide in the presence of carbon dioxide with an aqueous solution of guanidine having a pH of 8.4 to 11.6, filtering the slurry and concentrating and extracting dicyandiamide from the filtrate the reaction taking place in the absence of any added ammonia.

2. In the preparation of dicyandiamide in accordance with the process of claim 1 by slurrying calcium cyanamide in the presence of carbon dioxide with an aqueous solution of guanidine having a pH of 8.4 to 11.6, the step of supplying carbon dioxide at such a rate as to maintain the pH of the solution at 8.4 the reaction taking place in the absence of any added ammonia.

3. The process of preparing dicyandiamide which comprises slurrying calcium cyanamide in the presence of carbon dioxide with a 3 to 10% aqueous solution of guanidine capable of combining with the carbon dioxide, the guanidine-carbon dioxide product reacting with the calcium cyanamide to form a calcium carbonate precipitate, filtering out the precipitate and concentrating the filtrate at a temperature of 60° to 80° C. and extracting dicyandiamide from the filtrate the reaction taking place in the absence of any added ammonia.

4. The process of preparing dicyandiamide which comprises slurrying calcium cyanamide in an aqueous solution containing guanidine, treating the slurry with carbon dioxide to form guanidine carbonate which reacts with the calcium cyanamide to precipitate calcium carbonate, filtering out the calcium carbonate, evaporating the filtrate at a temperature of 35° C. to 90° C., discontinuing the evaporation step and cooling the evaporated filtrate when crystals of dicyandiamide begin to precipitate and recovering therefrom the precipitated dicyandiamide the reaction taking place in the absence of any added ammonia.

5. The process of preparing dicyandiamide which comprises slurrying calcium cyanamide in a solution of mother liquor containing guanidine, treating the slurry with carbon dioxide to form guanidine carbonate which reacts with the calcium cyanamide to precipitate calcium carbonate, filtering out the calcium carbonate, evaporating the filtrate at a temperature of 35° C. to 90° C., discontinuing the evaporation step and cooling the evaporated filtrate when crystals of dicyandiamide begin to precipitate, and filtering therefrom the precipitated dicyandiamide as a filter cake, while returning the filtrate to the cycle as mother liquor to form a new slurry of calcium cyanamide the reaction taking place in the absence of any added ammonia.

JOHN L. OSBORNE.